United States Patent [19]

Sumiya et al.

[11] Patent Number: 4,698,279

[45] Date of Patent: Oct. 6, 1987

[54] MAGNETIC RECORDING MEDIUM

[75] Inventors: Kenji Sumiya, Suita; Yoji Takeuchi, Takatsuki, both of Japan

[73] Assignee: Hitachi Maxell, Ltd., Osaka, Japan

[21] Appl. No.: 918,975

[22] Filed: Oct. 15, 1986

[30] Foreign Application Priority Data

Oct. 15, 1985 [JP] Japan ................... 60-230572

[51] Int. Cl.$^4$ ............................... G11B 5/72
[52] U.S. Cl. ................... 428/411.1; 427/128; 427/131; 427/132; 428/457; 428/694; 428/695; 428/900
[58] Field of Search ........... 428/694, 695, 900, 411.1, 428/457; 427/128, 131, 132; 360/134–136

[56] References Cited

U.S. PATENT DOCUMENTS

| | | | |
|---|---|---|---|
| 3,922,389 | 11/1975 | Toledo | 427/132 |
| 4,074,012 | 2/1978 | Heikkinen | 428/694 |
| 4,153,754 | 5/1979 | Huisman | 428/900 |
| 4,315,057 | 2/1982 | Horigome | 428/694 |
| 4,396,674 | 8/1983 | Somezawa | 428/695 |
| 4,425,404 | 1/1984 | Suzuki | 428/695 |
| 4,464,279 | 8/1984 | Arai | 428/694 |
| 4,529,651 | 7/1985 | Kitoo | 427/131 |
| 4,592,948 | 6/1986 | Kohmoto | 427/131 |

Primary Examiner—Ellis P. Robinson
Attorney, Agent, or Firm—Birch, Stewart, Kolasch & Birch

[57] ABSTRACT

A magnetic recording medium improved in corrosion resistance and enhanced in running stability, which comprises a non-magnetic support, a magnetic layer provided on one surface (i.e. the major surface) of the support and a back coat layer provided on the other surface (i.e. the back surface) of the support, the magnetic layer comprising magnetic metal and the back coat layer comprising a salt formed between a nitrogen-containing heterocyclic compound and an aliphatic amine.

5 Claims, No Drawings

MAGNETIC RECORDING MEDIUM

BACKGROUND OF THE INVENTION

The present invention relates to a magnetic recording medium. More particularly, it relates to a magnetic recording medium, particularly of the type that the magnetic layer is kept in contact with the back coat layer, except recording and reproducing, such as a magnetic recording tape having a magnetic layer comprising a magnetic metal.

As magnetic recording media, there are known those having a magnetic layer comprising a magnetic metal oxide and those having a magnetic layer comprising a magnetic metal. In comparison with the former using a magnetic metal oxide, the latter using a magnetic metal is apt to be corroded. As the result of such corrosion, the saturation magnetization is decreased, the coefficient of friction is increased and the running stability is lowered. In case of those of vaporization type (i.e. those having a magnetic layer formed by vaporization of a magnetic metal), spotted rust is produced, and in case of those of an application type (i.e. those having a magnetic layer formed by application of a magnetic coating composition), the noise level is unfavorably increased. In addition, the running stability of those using a magnetic metal powder is greatly influenced by the lubricity at the surface of the magnetic layer.

In order to overcome the above problems as seen in a magnetic recording medium which comprises a support, a magnetic layer comprising a magnetic metal provided on one surface (i.e. the major surface) of the support and a back coat layer provided on the other surface (i.e. the back surface) of the support, it was proposed to incorporate a nitrogen-containing heterocyclic compound (e.g. benzotriazole, tolyltriazole) or a vaporizable aliphatic amine (e.g. diisopropylamine, octadecylamine, triethanolamine) into the back coat layer so as to improve the resistance of the magnetic layer to corrosion and enhance the running stability of the magnetic recording medium (cf. Japanese Patent Publication (unexamined) No. 122,621/83).

Incorporation of a nitrogen-containing heterocyclic compound into the back coat layer produces a considerable effect in improvement of the resistance of the magnetic layer to corrosion but shows no significant effect in enhancement of the running stability. Incorporation of an aliphatic amine produces a great effect in enhancement of the running stability but does not show any sufficient effect in improvement of the corrosion resistance. Incorporation of a nitrogen-containing heterocyclic compound and an aliphatic amine into the back coat layer was tried, but the produced effect for improvement of the corrosion resistance and enhancement of the running stability was poorer than that by their sole use.

SUMMARY OF THE INVENTION

As a result of extensive study, it has now unexpectedly been found that incorporation of the salt formed between a nitrogen-containing heterocyclic compound and an aliphatic amine into the back coat layer produces significant improvement of the corrosion resistance and remarkable enhancement of the running stability. The present invention is based on the above finding.

According to the present invention, there is provided a magnetic recording medium improved in corrosion resistance and enhanced in running stability which comprises a non-magnetic support, a magnetic layer provided on the major surface of the support and a back coat layer provided on the back surface of the support, the magnetic layer comprising a magnetic metal and the back coat layer comprising a salt formed between a nitrogen-containing heterocyclic compound and an aliphatic amine.

DETAILED DESCRIPTION

The non-magnetic support is usually shaped in the form of plate, sheet or film. Normally, it is made of an elastic polymeric material such as a polyester (e.g. polyethylene terephtahlate, polyethylene-2,6-naphthalate), a polyolefin (e.g. polyethylene, polypropylene), a cellulose acetate (e.g. cellulose triacetate, cellulose diacetate), a polyimide or a polyamide. It may have a thickness of about 10 to 100 $\mu$m.

The magnetic layer on the major surface of the non-magnetic support comprise magnetic metal. Examples of the magnetic metal are metals (e.g. metallic iron, metallic cobalt, metallic nickel), metal alloys comprising iron, cobalt and/or nickel optionally with other metals (e.g. copper, zinc, manganese, chromium, aluminum), etc. These may additionally and optionally comprise non-metallic components in small amounts.

Formation of the magnetic layer may be accomplished by a conventional procedure, for instance, by vaporizing the metallic component onto the major surface of the support. Alternatively, it may be accomplished by application of a coating composition comprising a liquid carrier (e.g. toluene, xylene, methyl ethyl ketone, cyclohexanone) and a magnetic metal powder and a resinous binder dissolved or dispersed in a liquid carrier onto the major surface. The magnetic metal powder may be the particles of the metallic component and has usually an average particle size (longer axis) of about 0.1 to 0.4 $\mu$m. The amount of the magnetic metal powder in the magnetic layer may be normally from 50 to 100% by weight on the basis of the magnetic layer. Examples of the resinous binder are vinyl chloride resin, vinyl acetate resin, vinyl chloride/vinyl acetate copolymer, vinyl chloride/vinyl acetate/vinyl alcohol copolymer, polyurethane resin, cellulose resin, polyester resin or its sulfonated product, vinylidene chloride/acrylonitrile copolymer, acrylonitrile/butadiene copolymer, isoprene rubber, butadiene rubber, photocurable resin, etc. A crosslinking agent such as a low molecular weight isocyanate compound may be optionally used in combination therewith. The thickness of the magnetic layer is usually from 0.08 to 0.2 $\mu$m the case of the magnetic layer being formed by vaporization or usually from 0.2 to 10 $\mu$m in the case of the magnetic layer being formed by application of a coating composition. When desired, the magnetic layer may comprise additionally and optionally any additive such as a lubricant (e.g. an aliphatic amine, a fatty acid, a fatty acid ester, a fluorinated oil). Alternatively, such lubricant may be top-coated onto the magnetic layer.

The back coat layer comprises a non-magnetic powder, a resinous binder and a salt formed between a nitrogen-containing heterocyclic compound and an aliphatic amine. As the non-magnetic powder, there may be used any one as conventionally employed for a back coat layer, such as carbon black, barium sulfate, calcium carbonate, aluminum oxide, titanium oxide, molybdenum disulfide, silica, etc. As the resinous binder, there may be used the one as exemplified for the magnetic layer. The amount of the non-magnetic powder in the back coat layer is varied with its kind and may be usually from about 20 to 800 parts by weight on the basis of 100 parts by weight of the resinous binder.

It is the most characteristic feature of the present invention that the back coat layer comprises a salt formed between a nitrogen-containing heterocyclic compound and an aliphatic amine. As the nitrogen-containing heterocyclic compound, there may be used any one known as the "$p$-excessive aromatic heterocyclic compound having one or more nitrogen atoms as the hetero atoms(s)". Such compound comprises usually a five-membered aromatic ring containing one or more nitrogen atoms as the ring member atoms, optionally with one or more aromatic rings condensed thereto. Specific examples of such compound are pyrroles, indoles (e.g. 1H-indole), pyrazoles, indazoles, triazoles (e.g. triazole, benzotriazole), imidazoles (e.g. imidazole, benzimidazole, 1H-naphtha[2,3-d]imidazole), carbazoles (e.g. 6H-dibenzo[b,h]carbazole), etc. These may be optionally substituted with methyl, hydroxy, amino, carboxy, etc. As the aliphatic amine, there may be employed any primary aliphatic amines (e.g. caprylamine, laurylamine, myristylamine, palmitylamine, cetylamine, stearylamine, octadecylamine, dodecylamine), secondary aliphatic amines (e.g. diethylamine, diamylamine), etc. Among various salts, preferred are those of triazoles, especially benzotriazole, with primary aliphatic amines, especially having 8 to 32 carbon atoms. The formation of the salt may be accomplished by mixing the nitrogen-containing heterocyclic compound and the aliphatic amine together in a polar solvent (e.g. water, ethanol) or mixing the reagents together at a temperature higher than their melting points. The amount of the salt in the back coat layer may be from 0.1 to 20% by weight, preferably from 0.5 to 9% by weight, based on the total weight of the back coat layer. When the amount is smaller than the lower limit, the desired effect can not be attained. When larger than the upper limit, such troubles as clogging of the magnetic head and sticking onto the magnetic head are produced.

The back coat layer may be formed by application of a coating composition comprising the non-magnetic powder, the resinous binder and the salt formed between a nitrogen-containing heterocyclic compound and an aliphatic amine onto the back surface, followed by drying. Alternatively, it may be formed by application of a coating composition comprising the non-magnetic powder and the resinous binder onto the back surface, followed by application of a solution of the salt thereto. The thickness of the back coat layer thus formed may be usually from about 0.2 to 4.0 $\mu$m. Still, when desired, the back coat layer may additionally comprise any additive.

PREFERRED EMBODIMENTS

Practical and presently preferred embodiments of this invention will be hereinafter explained more in details, wherein part(s) and % are by weight.

EXAMPLE 1

Onto the major surface of a base film made of a polyester having a thickness of 12 $\mu$m as the non-magnetic support, metallic cobalt was vaporized by the use of a vacuum vaporization apparatus under an oxygen atmosphere of $5 \times 10^{-5}$ Torr, followed by application of surface treatment thereto to make a magnetic layer of 0.1 $\mu$m in thickness. A 1% Freon solution of a fluorinated oil (perfluoro polyether having a molecular weight of about 2,000) was applied onto the magnetic layer.

Onto the back surface of the base film, a coating composition having the following composition was applied and dried to make a back coat layer of 1.0 $\mu$m in thickness, followed by surface treatment:

|  | Part(s) |
| --- | --- |
| Carbon black | 300 |
| Nitrocellulose | 100 |
| Polyurethane resin | 70 |
| Trifunctional low molecular weight isocyanate compound | 30 |
| Salt of benzotriazole with laurylamine (1:1 by mole) | 10 |
| Cyclchexanone | 750 |
| Toluene | 750 |

The resulting film was cut in a pre-determined width to make a magnetic recording tape.

EXAMPLE 2

In the same manner as in Example 1 but using the salt of benzotriazole with stearylamine (1:1 by mole) (10 parts) in place of the salt of benzotriazole with laurylamine, there was prepared a magnetic recording tape.

COMPARATIVE EXAMPLE 1

In the same manner as in Example 1 but using benzotriazole (10 parts) in place of the salt of benzotriazole with laurylamine, there was prepared a magnetic recording tape.

COMPARATIVE EXAMPLE 2

In the same manner as in Example 1 but using laurylamine (10 parts) in place of the salt of benzotriazole with laurylamine, there was prepared a magnetic recording tape.

COMPARATIVE EXAMPLE 3

In the same manner as in Example 1 but using benzotriazole (5 parts) and laurylamine (5 parts) in place of the salt of benzotriazole with laurylamine, there was prepared a megnetic recording tape.

COMPARATIVE EXAMPLE 4

In the same manner as in Example 1 but using stearylamine (10 parts) in place of the salt of benzotriazole with laurylamine, there was prepared a magnetic recording tape.

COMPARATIVE EXAMPLE 5

In the same manner as in EXAMPLE 1 but using benzotriazole (5 parts) and stearylamine (5 parts) in place of the salt of benzotriazole with laurylamine, there was prepared a magnetic recording tape.

With respect to the magnetic recording tapes as obtained in Examples 1-2 and Comparative Examples 1-5, the coefficient of friction at the back coat layer, the fluctuation and the corrosion resistance of the magnetic layer were tested by the following procedures:

Coefficient of Friction:

The magnetic recording tape was suspended on a steel made cylinder of 4 mm in diameter (surface roughness, 0.2S) with an angle of 90° in such manner as contacting the back coat layer onto the cylinder. A load of 20 grams was charged to one edge of the tape, and the other edge was pulled at a speed of 1.4 cm/second. After 1,000 times of sliding movement in said manner, the coefficient of friction was determined.

Fluctuation:

The magnetic recording tape was applied onto a video deck, and video signals were recorded and reproduced. The interval of the horizontal synchronizing signals at a reproducing signal of 15.75 KHz was read off, and the fluctuation of the horizontal synchronizing signal for 1 second was measured.

Corrosion Resistance:

(a) Variation of saturation magnetization

The magnetic recording tape was allowed to stand at a temperature of 60° C. under a relative humidity of 90%. After 7 days, the maximum magnetic flux density was measured. The corrosion resistance was indicated by the relative value to the maximum flux density of the magnetic recording tape before testing, which was taken as 100%.

(b) Spotted rust:

The magnetic recording tape was allowed to stand at a temperature of 60° C. under a relative humidity of 90%. After 1 month, the number of rust spots per 1 mm$^2$ was counted by the aid of an optical microscope. The spotted rust appeared as a phenomenon characteristic to the magnetic recording tape of vaporization type.

TABLE 1

| Example | Coefficient of friction | Fluctuation (uS) | Corrosion resistance Variation of saturated magnetization (%) | Spotted rust (number of spots) |
|---|---|---|---|---|
| 1 | 0.19 | 0.12 | 95 | 3–8 |
| 2 | 0.20 | 0.10 | 94 | 2–8 |
| Comparative | | | | |
| 1 | 0.46 | 0.37 | 94 | 3–12 |
| 2 | 0.20 | 0.11 | 81 | 250–300 |
| 3 | 0.26 | 0.14 | 91 | 40–90 |
| 4 | 0.19 | 0.11 | 75 | 300–500 |
| 5 | 0.24 | 0.14 | 88 | 200–250 |

EXAMPLE 3

Onto the major surface of a base film made of a polyester having a thickness of 8.0 μm as the non-magnetic support, a magnetic coating composition having the following composition was applied thereto, followed by drying to make a magnetic layer of 3 μm in thickness:

| | Parts(s) |
|---|---|
| alpha-Fe metal powder (average particle size, 0.25 μm) | 80 |
| "VAGH" (hydroxyl group-containing vinyl chloride/vinyl acetate copolymer manufactured by Union Carbid) | 12 |
| "Takenate L-1007" (urethane prepolymer manufactured by Takeda Chemical) | 7 |
| Trifunctional low molecular weight Isocyanate compound | 1 |
| n-Butyl stearate | 3 |
| Toluene | 60 |
| Methylisobutylketone | 60 |

Onto the back surface of the base film, the same coating composition comprising the salt of benzotriazole with laurylamine (1:1 by mole) as in Example 1 was applied, followed by drying to make a back coat layer of 1.0 μm in thickness.

After surface treatment, the resultant film was cut in a pre-determined width to make a magnetic recording tape.

EXAMPLE 4

In the same manner as in Example 3 but using the salt of benzotriazole with stearylamine (1:1 by mole ) (10 parts) in place of the salt of benzotriazole with laurylamine, there was prepared a magnetic recording tape.

COMPARATIVE EXAMPLE 6

In the same manner as in Example 3 but using benzotriazole (10 parts) in place of the salt of benzotriazole with laurylamine, there was prepared a magnetic recording tape.

COMPARATIVE EXAMPLE 7

In the same manner as in Example 3 but using laurylamine (10 parts) in place of the salt of benzotriazole with laurylamine, there was prepared a magnetic recording tape.

COMPARATIVE EXAMPLE 8

In the same manner as in Example 3 but using benzotriazole (5 parts) and laurylamine (5 parts) in place of the salt of benzotriazole with laurylamine, there was prepared a magnetic recording tape.

COMPARATIVE EXAMPLE 9

In the same manner as in Example 3 but using stearylamine (10 parts) in place of the salt of benzotriazole with laurylamine, there was prepared a magnetic recording tape.

COMPARATIVE EXAMPLE 10

In the same manner as in Example 3 but using benzotriazole (5 parts) and stearylamine (5 parts) in place of the salt of benzotriazole with laurylamine, there was prepared a magnetic recording tape.

With respect to the magnetic recording tapes as obtained in Examples 3–4 and Comparative Examples 6–10, the coefficient of friction at the back coat layer, the fluctuation and the corrosion resistance of the magnetic layer were tested by the procedures as stated above. The variation of the noise level was also examined by the following procedure:

Variation of Noise Level

The magnetic recording tape was allowed to stand at a temperature of 60° C. under a relative humidity of 90%. After 30 days, the tape was subjected to running under a tension of 6 grams at a tape speed of 1.4 meters per second by the aid of at standard video tape recorder. The noise level was measured and indicated by a relative value to that of Example 1, which was taken as 0 dB.

The results are shown in Table 2.

TABLE 2

| Example | Coefficient of friction of back coat layer | Fluctuation (uS) | Corrosion resistance Variation of saturated magnetization (%) | Noise level (dB) |
|---|---|---|---|---|
| 3 | 0.17 | 0.10 | 95 | 0 |
| 4 | 0.18 | 0.09 | 96 | +0.5 |
| Comparative | | | | |
| 6 | 0.38 | 0.25 | 93 | +0.5 |

TABLE 2-continued

| Example | Coefficient of friction of back coat layer | Fluctuation (uS) | Corrosion resistance Variation of saturated magnetization (%) | Noise level (dB) |
| --- | --- | --- | --- | --- |
| 7 | 0.20 | 0.11 | 84 | +2.8 |
| 8 | 0.22 | 0.13 | 90 | +1.0 |
| 9 | 0.18 | 0.10 | 80 | +3.2 |
| 10 | 0.23 | 0.13 | 89 | +1.5 |

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A magnetic recording medium which comprises a non-magnetic support, a magnetic layer provided on one surface (i.e. the major surface) of said support and a back coat layer provided on the other surface (i.e. the back surface) of said support, the magnetic layer comprising a magnetic metal, the back coat layer comprising a resinous binder and a salt formed between a nitrogen-containing heterocyclic compound and an aliphatic amine.

2. The magnetic recording medium according to claim 1, wherein said nitrogen-containing heterocyclic compound is a triazole.

3. The magnetic recording medium according to claim 2, wherein said triazole is a benzotriazole.

4. The magnetic recording medium according to claim 1, wherein the aliphatic amine is the one chosen from stearylamine, palmitylamine, myristylamine and laurylamine.

5. The magnetic recording medium according to claim 1, wherein said salt is contained in said back coat layer in content of 0.1 to 20% by weight based on the weight of the back coat layer.

* * * * *